United States Patent Office 3,532,504
Patented Oct. 6, 1970

3,532,504
PROCESS FOR THE PRODUCTION OF ISOHUMULONE-CONTAINING HOP EXTRACTS
Peter Flesch, Mainz-Gonsenheim, Germany, assignor to Aktiengesellschaft für Brauerei-Industrie, Basel, Switzerland, a company of Switzerland
No Drawing. Filed Dec. 30, 1966, Ser. No. 606,009
Claims priority, application Switzerland, Jan. 5, 1966, 123/66
Int. Cl. C12c 9/02
U.S. Cl. 99—50.5       8 Claims

ABSTRACT OF THE DISCLOSURE

Isohumulone-containing hop extracts are produced by extracting hops or unisomerized hop extracts at a beginning pH of between 9 and 10 maintaining the pH between 8 and 9 during extraction and allowing the pH to diminish to the neutral point towards the end of the extraction. Isomerization is effected while carrying out the process at temperatures up to 50° C.

---

It is known that the so-called hop bitter of a beer is caused largely by its content of isohumulone. Isohumulone is formed from humulone by isomerisation under certain conditions. For the sake of simplicity in this saponification, all bitter acids precipitatable with lead acetate are included in the term "humulone." Thus, the term "isohumulone" is intended to include the corresponding isomerised bitter acids.

In conventional brewing natural hops and/or a hop extract is added to the boiling wort, to cause the humulone to be converted into isohumulone during boiling. However the finished beer contains only about 25% of the amount of isohumulone which would theoretically be expected quantitatively based on the humulone content of the hops and/or hop extract used. By far the greatest loss of bitter agent takes place during the boiling of the wort although a slight loss also takes place in the principal and secondary fermentations. Apparently the extraction of the bitter acids from the hops does not take place quantitatively at the pH value of the wort, i.e. at a pH of between about 4.8 and 5.4. Considerable loss of bitter acids may also occur if commercial natural hops are stored for prolonged periods.

For decades research has been conducted into methods of adding hops to beer which would give a more profitable yield of bitter acids. Methods proposed for this purpose have mainly followed the line of extracting the extractable substances (particularly the bitter acids) from the hops with organic solvents and protecting the extracted substances against rearrangement or degradation. It has been found however that the hop extracts thus obtained are not ideal because:

(a) A conversion of humulone into isohumulone does not occur during extraction with organic solvents so that the extracts, like natural hops, have to be added during the boiling of the wort so that the aforementioned loss occasioned during the boiling still arises.

(b) Certain aroma substances and other constituents of the hops which are not dissolved out during conventional aqueous extraction, are found in the hop extracts produced using organic solvents. The presence of these additional constituents, which are per se foreign to beer, has meant that there has been no widespread use in brewing processes of hop extracts prepared with organic solvents. In practice it has been found to be impossible to dispense with substantial additions of natural hops when using hop extracts prepared with organic solvents; and (c) Hop extracts prepared using organic solvents have only slight solubility in water.

In addition to proposals for the extraction of the bitter acids from hops using organic solvents there have also been proposals for lixiviating natural hops by boiling them for several hours in pure water and for improving the yield of bitter acids by ultrasonic treatment of the hops in an aqueous medium prior to adding the resultant solutions to the wort. Direct ultrasonic treatment of the wort to which the hops have already been added has also been proposed.

Attempts have also been made to improve the yield of bitter acids by effecting the boiling of the hops in a weakly acid medium or in an alkaline medium. Moreover methods have been worked out according to which the humulone resins in the non-volatile fraction of the hop extracts is isomerised by a complicated method or the inactive constituents are activated. In this way a second water-soluble extract is obtained besides the organic extract.

Opinion is divided as to the advantage in the extraction of bitter acids or the conversion of humulone into isohumulone which can be gained with the said methods; in any case, according to published accounts, no significant saving in hops is obtained. It has not hitherto been possible with any of the known methods to achieve an extensive or even a complete extraction of the bitter acids and at the same time isomerise the humulone into isohumulone.

An attempt has now been made to develop a process for the production of a hop extract containing isohumulone which has the following advantages:

(1) An extraction of the bitter acids and the other constituents of the hops required for the manufacture of beer with a yield which is, quantitatively, as close to the theoretical as possible;

(2) Extensive or complete isomerisation of humulone to isohumulone during the extraction process in a technically simple manner;

(3) Easy solubility of the extract in water. In order to achieve these advantages it is impossible according to the process of the invention to carry out the extraction of the hops with an organic solvent or a plurality of organic solvents, because of the disadvantages described above.

The combined use of an organic solvent (for example methanol, dichloroethylene or trichloroethylene) and an aqueous solvent (for example aqueous ammonia) as has been recently proposed, is also unsatisfactory because here again two extracts having different compositions are obtained.

According to the present invention a process for the production of isohumulone-containing hop extracts comprises extracting hop bitter acids in the form of their alkali metal salts from hops or a commercially available hop extract with water containing alkaline or basic alkali metal salts, and subsequently isomerising the humulone to isohumulone.

Since the alkali metal salts of the bitter acids are considerably more soluble in water than the bitter acids themselves, the humulone is extracted far more completely by means of the process according to this invention (depending on the quality of the hops up to 100% extraction is possible) than by known methods.

It is advantageous to adjust the pH value of the aqueous extraction solution containing the hops and/or hop extract at the beginning of the extraction, for example to between 9 and 10, to keep it between 8 and 9 by continuous or periodic addition of further alkali or further basic alkali metal salts and then to allow it to diminish to the neutral point towards the end of the extraction. If the pH value is not lowered at the end of the extraction, the isohumulone may be further converted into humulic acid and further into hard resin which is useless as a bitter agent in brewing.

It is therefore advantageous to use no more alkali or basic alkali metal salt than is necessary for the complete neutralisation of the total hop acids (bitter acids, malic acid, citric acid and the like). The amount may easily be ascertained by a preliminary experiment. The permissible alkali content of the extract is also limited by the pH value of the beer (about 5).

It has proved to be particularly advantageous to carry out the process according to the invention with mechanical stirring of the batch at room temperature or at a temperature up to 50° C. Oxidative loss of the bitter acids may be avoided by the use of methods known per se, such as the addition of sodium ascorbate or by the exclusion of atmospheric oxygen.

Extraction and isomerisation proceeds more rapidly, but according to the conditions not without loss, at the boiling point of water; it has proved advantageous in this case to use a steam autoclave or a vacuum plant. When using a steam autoclave, the period in which the humulone conversion takes place is advantageously quantitatively ascertained by isohumulone analysis. When extraction at elevated temperature is complete, the batch is advantageously cooled at once and protected from the action of light.

The amount of water and hops to be used in the process according to this invention are dependent on the solubility of the alkali salts of the bitter acids. Apart from the fact that the solubility in water of the salts is considerably greater than that of the free bitter acids, modern techniques readily permit careful and economic concentration of dilute aqueous solutions.

Concentration in a vacuum rotational vaporiser (with a water bath temperature of preferably 40° C.) has proved to be most advantageous.

The solution which has been carefully evaporated, for example to about one tenth of the original volume, may be used as such in the production of beer (for example from 0.6 to 1 litre of concentrated solution to 100 litres of beer) or may be freeze-dried. The freeze-dried residue is a loose powder and dissolves well in water. Preliminary concentration and freeze-drying do not cause any appreciable loss of bitter principle.

The extraction solution containing the bitter agent or the concentrated solution may also be subjected to spray drying. To avoid loss by oxidation, the spray drying is advantageously carried out in an atmosphere of nitrogen.

In addition to concentration, freeze-drying and spray drying, it is also possible to extract the bitter agent from the aqueous solution after it has been acidified (preferably using hydrochloric acid), with a suitable organic solvent, for example petroleum ether. The extract thus obtained contains the free bitter acids in a fairly pure form which may be freed from the solvent in vacuo.

A product which is just as pure, but which contains the alkali metal salts of the bitter acids, is obtained by subjecting a commercially available hop extract to an aqueous alkaline extraction in a manner similar to that described for natural hops.

The products obtained according to the invention may also be used for pharmaceutical purposes.

The advantages of the process according to this invention in the production of beer are as follows:

(1) In the hopping of beer with an extract prepared according to this invention, addition to the boiling brew may be dispensed with; rather the extract or a concentrated extraction solution may be added at any time after the wort has been boiled, preferably following the alcoholic fermentation.

(2) The extract obtained according to the process of this invention is capable of unlimited storage provided moisture and atmospheric oxygen are excluded (preferably by storing in vacuo).

(3) The very substantial fluctuation in the price of natural hops may be evened out, at least to a considerable extent, by a compensated manufacture of hop extracts.

(4) The brewing process is considerably less complicated because spent hops no longer occur.

(5) No loss of bitter agent occurs during the addition of the extract.

The invention will now be further described in the following examples.

EXAMPLE 1

1964 Saazer hops (I) are used which have been stored for six months and which have the following analysis:

α-acids—4.9%
β-acids—6.9%
Soft resin—11.8%
Hard resin—3.1%
Total resin—14.9%
Water content—10.2%
Bitter value according to Kohlbach—5.45

The α-acids and β-acids are determined spectrophotometrically according to the method proposed by Alderton and his collaborators in 1954.

To determine how much alkali these hops require in hot or cold aqueous extraction up to the neutral reaction, 5.0 g. of the hops in each case in the air-dry condition, are treated as follows:

(a) *Hot extraction.*—5.0 g. of hops is placed in a 500 ml. Erlenmeyer flask and 240 ml. of distilled water and 5 ml. of 2-normal caustic potash solution is added and the whole is heated with steam for fifteen minutes in an autoclave. The batch is then cooled and the hops are filtered off with a cloth, washed and squeezed. The extraction solution is brought to exactly 250 ml. in volume and such an amount of 1-normal hydrochloric acid is added that the pH value reaches the neutral point (Lyphan paper). With the hops (I) a back titration with hydrochloric acid is not necessary; 1.0 g. of hops thus consumes 1.0 ml. of 2-normal caustic potash solution.

(b) *Cold extraction.*—5.0 g. of the hops (I) are placed in a brown wide necked flask having a screw closure and 240 ml. of distilled water and 5.0 ml. of 2-normal caustic potash solution are added. The batch remains in the closed flask overnight at room temperature and then with the cover removed, is stirred mechanically for two hours and the hops then removed from the solution as previously described. Back titration with 1-normal hydrochloric acid gives an alkali consumption of 3.0 ml., i.e. 0.6 ml. of 2-normal caustic potash solution or an equivalent amount of an alkali metal salt is required for neutralising each gram of the hops (I). The consumption of alkali depends on the duration of stirring and the degree of disintegration of the cell structure of the hops. It is therefore advisable to work with a somewhat larger amount of alkali than that determined.

Yield of isohumulone in dependence on the amount of hops used per litre of extraction liquid The following amounts of hops are placed in 1-litre Erlenmeyer flasks, distilled water and the necessary amount of caustic potash solution are added and also 0.6 g./l. of sodium ascorbate for protection against oxidation of bitter agent. The batch is heated with steam in an autoclave for fifteen minutes and after having stood in the dark for eighteen hours is subjected to filtration. Each batch is brought to exactly 1 litre of extraction solution with the washing water. Spectrophotometric determination of isohumulone, carried out according to Klopper (1957), gives the following results:

| Batch | Amount of hops, g./l. | Isohumulone content Mg./l.[1] | Percent of theory |
|---|---|---|---|
| 1 | 10.0 | 76.5 | 78.1 |
| 2 | 20.0 | 74.5 | 76.1 |
| 3 | 30.0 | 62.5 | 63.7 |
| 4 | 40.0 | 54.0 | 55.1 |

[1] These and isohumulone values given in all the following examples relate to 2.0 g./l. of hops used.

The marked decline in the isohumulone values may have some connection with the solubility of the isohumulone alkali metal salts in water, but not with the solubility of the isohumulone in isooctane used for the determination. An extraction is still technically possible in the range from 20 to 30 g. of hops per litre.

Hot aqueous alkaline extraction of hops compared with pure aqueous extraction

Batch 1.—20 g. of hops are placed in a 1-litre Erlenmeyer flask and 980 ml. of distilled water, the necessary amount of caustic potash solution and 0.6 g. of sodium ascorbate are added.

Batch 2.—Analogous to batch 1 but without the addition of alkali.

Both batches are autoclaved for fifteen minutes in a steam bath, allowed to stand for sixteen hours in the dark and filtered off from the spent hops. The pH value and isohumulone content are determined in the batches after they have been brought up to exactly 1 litre.

The pH value of batch 1 is 7.4 (Lyphan paper) and that of batch 2 is 4.5.

Determination of isohumulone gives 74.4 mg./l. in batch 1 and 19.2 g./l. in batch 2, with reference to 2 g. of hops. Batch 1 contains 76% and batch 2 on the contrary only 19.6% of the amount of isohumulone theoretically possible.

EXAMPLE 2

980 ml. of distilled water, 0.6 g. of sodium ascorbate and 10 ml. of 2-normal caustic potash solution are added to 20.0 g. of hops (I) in a 1 litre wide-necked flask, allowed to stand for fourteen hours at room temperature and then mechanically stirred for two hours. After this time, the pH value has fallen to 7.5. Another 2 ml. of caustic potash solution is added and the whole is stirred for another hour. The batch is then allowed to stand for four hours in the closed flask, filtered through a cloth, the hops pressed out well and the yellowish solution obtained is made up with the wash water to 1 litre. The pH value is now 7.4 and the isohumulone content is 93.6 mg./l. with reference to 2 g./l. of hops (95.5% of the theory).

The extraction solution is stored in a litre flask closed in an airtight manner in a referigerator at 4° C. for eight weeks. Determination of the isohumulone content carried out thereafter gives 88.4 mg./l. The loss is about 5% and is within the limits of error of the method of determination.

EXAMPLE 3

2900 ml. of distilled water, 1.8 g. of sodium ascorbate and the necessary amount of 2-normal caustic potash solution are added to 90 g. of hops (I) in a 5 litre Erlenmeyer flask and heated by steam in an autoclave for twenty minutes. The hops are filtered off on the next day, washed, and the spent hops are pressed out well. The extraction solution is brought to 3 litres and has a pH value of 7.3 and an isohumulone content of 63 mg./l. with reference to 2 g. of hops per litre. The batch is divided into three equal portions which are worked up in different ways.

Batch (A) is concentrated to about 100 ml. in a vacuum rotational evaporator at a temperature of about 40° C. with an addition of 2 ml. of silicon antifoam emulsion (duration two hours). The solution which remains is strongly bitter and has a precipitate. The sediment dissolves completely again when the remaining solution is made up with the distillate. An isohumulone determination carried out at this stage gives a value of 68 mg./l. loss of isohumulone by the concentration of the extraction solution in the rotational evaporator is thus not established.

Then batch (A) is freeze-dried without any carrier material. A brownish loose powder is obtained having a strongly bitter taste. The yield is 4.6 g. (air dried) with reference to 10.0 g. of hops.

Batch (B) has 25 g. of glucose added to it and it is then freeze-dried. A hygroscopic, slightly coloured powder remains. The isohumulone content is determined after dissolving an aliquot portion with 65 mg./l. (2 g. of hops).

Batch (C) has 25 g. of mannitol added to it and it is then treated as in batch (A). The residue is not hygroscopic and has an isohumulone content of 66 mg./l.

The good water-solubility of the preparations obtained according to (A) to (C) is noteworthy. Beer prepared from preparations (B) and (C) does not differ from the control beer, apart from the stronger bitters.

EXAMPLE 4

1964 hops (II) of unknown origin are used having the following analysis:

$\alpha$-acids—4.0%
$\beta$-acids—5.1%
Soft resins—9.1%
Hard resins—2.6%
Total resins—11.7%
Water content—11.8%
Bitter value according to Wöllmer _____ 4.57

The consumption of alkali in a hot aqueous extraction is 0.96 ml. of 2-normal caustic potash per gram of hops.

40 g. of the hops are placed in a 3 litre Erlenmeyer flask and 1970 ml. of distilled water, 1.2 g. of sodium ascorbate and the necessary amount of caustic soda solution are added, the whole is mixed and heated with steam for twenty minutes in an autoclave. It is then cooled, filtered through a cloth, washed with some water and the spent hops are pressed out well. The pH value of the 2 litres of extraction solution is 7.3.

To extract the bitter agent, the solution is acidified with 200 ml. of 25% hydrochloric acid and shaken in a shaking funnel with petroleum ether (boiling point 40° to 60° C.) with an addition of a few millilitres of butanol four times to separate the emulsion. The pale yellow coloured petroleum ether is dried over calcium chloride and for the most part withdrawn at a water bath temperature of 60° C. and the remaining solution has 10 g. of mannitol added to it and the petroleum ether is then evaporated completely. A yellowish preparation remains which has a strongly bitter taste. The yield of bitter agent is 2.4 g. (66% of the theory).

Thin layer analysis of the extract dissolved in methanol shows it to consist mainly of lupolone and isohumulone.

EXAMPLE 5

1965 Hersbruck hops (III) are used which have been stored for six weeks; analysis of these hops showed the following result:

$\alpha$-acids—4.4%
$\beta$-acids—8.7%
Soft resins—13.1%
Hard resins—1.9%
Total resins—15.0%
Water content—12.6%
Bitter value according to Wöllmer—5.37

0.87 ml. of 2 - normal caustic soda solution is required per gram of hops for neutralisation of the hops in a hot aqueous extraction, and 0.6 ml. in an extraction at room temperature.

40 g. of hops are added to 1950 ml. of distilled water, 12.5 ml. of 2-normal caustic soda solution and 1.2 g. of sodium ascorbate in a 2 litre wide-neck flask of brown glass and mechanically stirred for two hours. After this, the flask is sealed and the batch is allowed to stand for two hours at room temperature. It is then stirred for another hour. The spent hops are then pressed out in a linen cloth and washed with a little water so that the filtrate has a volume of exactly 2 litres. The determination of isohumulone in the deep yellow solution gives 82.15 mg./litre, with reference to 2 g. of hops; i.e. 93.4% of the theory.

To determine how much humulone or isohumulone has remained in the spent hops these are mixed with 500 ml. of water which has been alkalised with 2.5 ml. of 2-normal caustic soda solution and stirred for 2 hours. A further 12.6 mg./litre of isohumulone per 2 g. of hops can be detected in the resultant solution, so that a total of 94.75 mg. of isohumulone (i.e. 105.4% of the theory) has been obtained. A measuring error can be excluded because the result is reproducible. It must therefore be that the toluene extraction according to the method of Alderton and his collaborators has not assessed the total humulone content of the hops.

What I claim is:

1. A process for the production of isohumulone-containing hop extracts by means of aqueous alkaline extraction of hops or unisomerized hop extracts which comprises adjusting the pH value of the extraction solution at the beginning of the extraction to between 9 and 10 and then maintaining the pH value between 8 and 9 by continuously or discontinuously adding further alkali during the extraction and allowing the pH to fall off to about 7 towards the end of the extraction, said process being carried out at temperatures up to 50° C.

2. A process according to claim 1 wherein the hops are fresh hops.

3. A process according to claim 1, in which the extraction of the bitter acids and isomerisation of humulone to isohumulone is carried out while stirring and heating.

4. A process according to claim 1, wherein a neutral aqueous extraction solution is freed of hops, and is then concentrated, by means of a vacuum rotational evaporator, to about one-tenth of the original volume.

5. A process according to claim 1, wherein a neutral aqueous extraction solution or the concentrated aqueous solution is acidified, the bitter acids contained therein are extracted with an organic solvent not miscible with water and the solvent is then removed in vacuo.

6. In a method for the production of beer, the improvement according to which the isohumulone prepared according to claim 1 is added to the beer after the wort has been boiled.

7. A process according to claim 1 wherein the alkaline hop extract is neutralized and subjected to freeze-drying or spray-drying.

8. A process according to claim 1 wherein the pH is allowed to diminish to the neutral point towards the end of the extraction.

References Cited

UNITED STATES PATENTS

| | | | |
|---|---|---|---|
| 1,149,704 | 8/1915 | Wahl | 99—50.5 |
| 2,816,032 | 12/1957 | Heyer | 99—50.5 |
| 3,354,219 | 11/1967 | Rigby | 99—50.5 |
| 3,364,265 | 1/1968 | Klingel et al. | 99—50.5 |

LIONEL M. SHAPIRO, Primary Examiner